March 8, 1927.
C. W. FREDERICK ET AL
1,620,337
OBJECTIVE
Filed Jan. 17, 1923
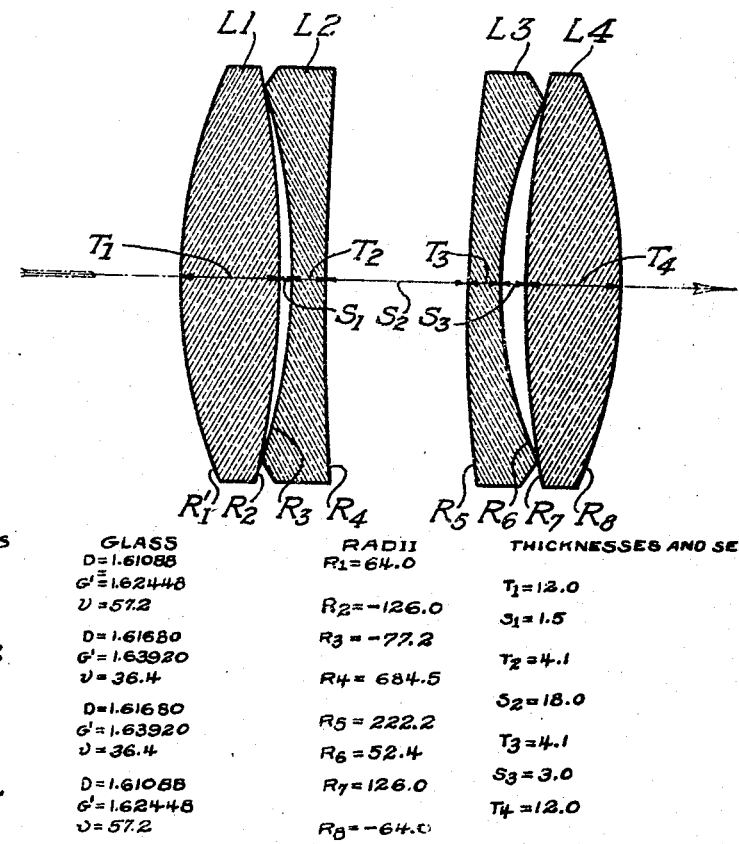
| LENS | GLASS | RADII | THICKNESSES AND SEPARATIONS |
|---|---|---|---|
| L1 | $D=1.61088$<br>$G'=1.62448$<br>$\nu=57.2$ | $R_1=64.0$<br>$R_2=-126.0$ | $T_1=12.0$<br>$S_1=1.5$ |
| L2 | $D=1.61680$<br>$G'=1.63920$<br>$\nu=36.4$ | $R_3=-77.2$<br>$R_4=684.5$ | $T_2=4.1$<br>$S_2=18.0$ |
| L3 | $D=1.61680$<br>$G'=1.63920$<br>$\nu=36.4$ | $R_5=222.2$<br>$R_6=52.4$ | $T_3=4.1$<br>$S_3=3.0$ |
| L4 | $D=1.61088$<br>$G'=1.62448$<br>$\nu=57.2$ | $R_7=126.0$<br>$R_8=-64.0$ | $T_4=12.0$ |
Charles W. Frederick & Fred E. Altman,
INVENTOR
BY
ATTORNEYS Patented Mar. 8, 1927.

1,620,337

UNITED STATES PATENT OFFICE.

CHARLES W. FREDERICK AND FRED E. ALTMAN, OF ROCHESTER, NEW YORK, ASSIGNORS TO EASTMAN KODAK COMPANY, OF ROCHESTER, NEW YORK, A CORPORATION OF NEW YORK.

OBJECTIVE.

Application filed January 17, 1923. Serial No. 613,270.

Our invention relates to an objective and more particularly to one for projection purposes. The requirements of such an objective are that it shall be of wide aperture and be well corrected over a relatively narrow angle of field. The objective which we have provided to meet these requirements is of the type having four air spaced elements, the outer ones being positive and the inner ones negative.

The structural features of principal importance by which our objective distinguishes over those of like type in the prior art are the making of one of the negative elements of meniscus form and the very narrow spacing between the front two elements.

These and other features will appear and be pointed out in the following specification and claims, reference being made to the accompanying drawing in the single figure of which is shown an axial section of an objective embodying our invention.

This objective comprises four lenses, from front to back as follows: L1 a biconvex lens of barium crown glass, L2 a biconcave lens of dense flint: L3 a meniscus negative lens also of dense flint; and L4 a lens identical both in glass and curvatures with L1 and symmetrically arranged with respect to the center of the objective. The central space $S_2$ is large compared with the other spaces, $S_1$ and $S_3$, dividing the objective into two components. The space $S_1$ is very narrow and is preferably less than a quarter of the thickness of the front component.

The objective is well corrected over a comparatively narrow angle, the formula given below being computed for a field of 7 degrees from the axis, but within that area the objective is corrected for spherical and chromatic aberration which are of particular importance and also for astigmatism, coma and flatness of field.

It is to be noted that the space between the negative and positive lens in each component is so small that the lenses contact at their edges. This insures the correct spacing of the elements and assists in the assembly of the objective, as the usual spacing rings are not needed.

In the accompanying table is set forth the data of a preferred example, the radii of the successive surfaces from front to back being designated $R_1$ to $R_8$, the thicknesses of the successive lenses $T_1$ to $T_4$, and the widths of the successive air spaces $S_1$ to $S_3$. There is given also the index of refraction of the glass for the D and G' lines and the value of the dispersive ratio ($\nu$) for the glass used.

Table for objective with aperture=F/2; focal length=100.

| Lens. | Glass. | Radii. | Thicknesses and separations. |
|---|---|---|---|
| L1 | D = 1.61088<br>G' = 1.62448<br>$\nu$ = 57.2 | $R_1$ = 64.0<br>$R_2$ = 126.0 | $T_1$ = 12.0<br>$S_1$ = 1.5 |
| L2 | D = 1.61680<br>G' = 1.63920<br>$\nu$ = 36.4 | $R_3$ = 77.2<br>$R_4$ = 684.5 | $T_2$ = 4.1<br>$S_2$ = 18.0 |
| L3 | D = 1.61680<br>G' = 1.63920<br>$\nu$ = 36.4 | $R_5$ = 222.2<br>$R_6$ = 52.4 | $T_3$ = 4.1<br>$S_3$ = 3.0 |
| L4 | D = 1.61088<br>G' = 1.62448<br>$\nu$ = 57.2 | $R_7$ = 126.0<br>$R_8$ = 64.0 | $T_4$ = 12.0 |

It is to be understood that the objective described is an example and that we contemplate as included within the scope of our invention all such modifications and equivalents as fall within the terms of the following claims.

Having thus described our invention, what we claim as new and desire to secure by Letters Patent is:

1. An objective comprising four air-spaced lenses, the outer ones being similar and positive and the inner ones being negative, one of the negative lenses being biconcave and the other being of meniscus form and each of the surfaces having a radius of curvature greater than .5 of the focal length of the objective.

2. An objective comprising two components, each having an outer positive lens of crown glass and an inner negative lens of flint glass spaced axially therefrom, one of the negative lenses being biconcave and the other being of meniscus form, each of the surfaces having a radius of curvature greater than .5 of the focal length of the objective and the thickness of the whole objective being less than .55 of its focal length.

3. An objective comprising two components, each having an outer positive lens of crown glass and an inner negative lens of flint glass spaced axially therefrom and contacting it at its edge, one of the negative lenses being biconcave and the other being of meniscus form, the concave side of the meniscus lens facing the corresponding positive lens.

4. An objective designed for projection purposes and comprising two components, each having an outer biconvex lens of barium crown glass and an inner negative lens of flint glass spaced axially from the corresponding positive lens, one of the negative lenses being biconcave and the other being of meniscus form, the positive lenses being similar as to form and symmetrically arranged.

5. An objective comprising two components, each having an outer positive lens of the same crown glass and an inner negative lens of flint glass spaced axially therefrom, one of the negative lenses being biconcave and the other being of meniscus form, the axial distance from the biconcave lens to the corresponding positive lens being less than one-fourth of the thickness of the positive lens.

6. An objective comprising two components, each having an outer positive lens of the same barium crown glass and an inner negative lens of flint glass spaced axially therefrom, one of the negative lenses being biconcave and the other being of meniscus form, the axial distance from each negative lens to the corresponding positive lens being not over one-fourth of the thickness of the positive lens.

7. An objective designed for projection purposes and comprising two components, each having an outer convex lens of barium crown glass and an inner negative lens of flint glass spaced axially from the corresponding positive lens by a distance not over one-fourth of the thickness of the positive lens, the negative lens in the front component being biconcave and the other being of meniscus form with its concave side facing the corresponding positive lens, the two positive lenses being identical and symmetrically arranged.

8. An objective of the type comprising spaced halves, each of which consists of an outer positive lens and an inner negative lens with a space between them in the shape of a positive meniscus and characterized by the axial width of such space being so chosen that the lenses contact at their edges.

9. An objective of the type comprising spaced halves, each of which consists of an outer positive lens and an inner negative lens with a space between them in the shape of a positive meniscus and characterized by the axial width of such space being not over one-quarter of the thickness of the corresponding positive lens, by the contacting of the lenses in each half at their edges and by the radius of curvature of each surface being greater than .5 of the focal length of the objective.

Signed at Rochester, New York this 12th day of January, 1923.

CHARLES W. FREDERICK.
FRED E. ALTMAN.